United States Patent
Licht et al.

(10) Patent No.: US 10,957,102 B2
(45) Date of Patent: Mar. 23, 2021

(54) VIRTUAL REALITY MAINTENANCE AND REPAIR

(71) Applicant: NCR Corporation, Duluth, GA (US)

(72) Inventors: Yehoshua Zvi Licht, Alpharetta, GA (US); Grant Charles Paton, Scotland (GB); Joseph Arnold White, Encinitas, CA (US); Mariano J. Maluf, Woodstock, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/471,523

(22) Filed: Mar. 28, 2017

(65) Prior Publication Data

US 2018/0204383 A1 Jul. 19, 2018

Related U.S. Application Data

(60) Provisional application No. 62/446,615, filed on Jan. 16, 2017.

(51) Int. Cl.
*G06T 19/20* (2011.01)
*G06T 19/00* (2011.01)
(Continued)

(52) U.S. Cl.
CPC ......... *G06T 19/006* (2013.01); *G06Q 10/101* (2013.01); *G06Q 10/20* (2013.01); *G06Q 20/00* (2013.01); *G06Q 20/18* (2013.01); *G06Q 20/3567* (2013.01); *G07F 9/006* (2013.01); *G07F 9/026* (2013.01)

(58) Field of Classification Search
CPC ...... G06T 19/006; G06Q 10/20; G06Q 20/18; G06F 17/50
See application file for complete search history.

(56) References Cited

U.S. PATENT DOCUMENTS

2006/0170652 A1* 8/2006 Bannai ..................... G06F 3/011
345/156
2010/0315416 A1* 12/2010 Pretlove .................. G06T 7/001
345/419

(Continued)

FOREIGN PATENT DOCUMENTS

JP 2005-202886 7/2005
WO 2014/206473 A1 12/2014

OTHER PUBLICATIONS

R. Bowen Loftin et al., "Virtual Environments in Training: NASA's Hubble Space Telescope Mission", 16th Interservice/Industry Training Systems & Education Conference, 1994. (Year: 1994).*

(Continued)

*Primary Examiner* — Diane M Wills
(74) *Attorney, Agent, or Firm* — Schwegman, Lundberg & Woessner

(57) ABSTRACT

A Virtual Reality (VR) system and method are provided that facilitates diagnosing and solving problems associated with a terminal. A VR session is established and a VA room rendered for participants. Files describing and program instructions for interactively manipulating the terminal are loaded into the VR room. At least one component piece of the SST is manipulated based on direction provided by a VR input device operated by a participant during the VR session.

16 Claims, 5 Drawing Sheets

(51) Int. Cl.
*G06Q 10/00* (2012.01)
*G06Q 20/18* (2012.01)
*G06Q 10/10* (2012.01)
*G07F 9/00* (2006.01)
*G06Q 20/00* (2012.01)
*G07F 9/02* (2006.01)
*G06Q 20/34* (2012.01)

(56) References Cited

U.S. PATENT DOCUMENTS

| | | | | |
|---|---|---|---|---|
| 2012/0118947 A1* | 5/2012 | Lyons | ................ | G07F 17/3241 235/375 |
| 2014/0208239 A1* | 7/2014 | Barker | ............. | G06F 15/17306 715/757 |
| 2015/0248793 A1* | 9/2015 | Abovitz | ............ | G06K 9/00671 345/633 |
| 2015/0331576 A1* | 11/2015 | Piya | ....................... | G06F 3/011 715/850 |
| 2015/0363980 A1* | 12/2015 | Dorta | ...................... | G06T 19/20 345/419 |
| 2016/0127712 A1* | 5/2016 | Alfredsson | ........ | H04N 21/4223 348/14.07 |
| 2016/0253563 A1* | 9/2016 | Lam | ....................... | H04L 63/08 348/130 |
| 2016/0379591 A1* | 12/2016 | Oya | ..................... | G06T 19/006 345/633 |
| 2017/0061631 A1* | 3/2017 | Karasudani | ........ | G06K 9/00201 |
| 2017/0124770 A1* | 5/2017 | Vats | ........................ | G06T 19/20 |

OTHER PUBLICATIONS

Emulate 3D—Industrial Controls Testing et al: "Multiple Virtual Reality Users in One Model—HTC Vive", You Tube, Jul. 4, 2016 (Jul. 4, 2016), p. 1, XP054978440, Retrieved from the Internet: URL:https//www.youtube.com/watch?v=bXxoit3pns0 [retrieved on Jun. 19, 2018] * the whole document *.

* cited by examiner

VIRTUAL REALITY MAINTENANCE AND REPAIR

RELATED APPLICATIONS

This application claims priority to U.S. Provisional Application Ser. No. 62/446,615 entitled: "Virtual Reality System for Diagnosis and Repair," filed on Jan. 16, 2017; the disclosure of which is incorporated by reference herein in its entirety.

BACKGROUND

Sending technicians to diagnose and solve problems in systems, such as computer-based systems, is costly. One such example, is sending a technician to diagnose problems with Self-Service Terminals (SSTs), such as Automated Teller Machines (ATMs) and kiosks.

Moreover, often times a technician may need another technician with more experience to help solve any SST problems, which means repair of the SST is delayed during which time the SST is unavailable for customer access.

SUMMARY

In various embodiments, methods and a system for Virtual Reality (VR) repair and maintenance are presented.

According to an embodiment, a method for VR maintenance and repair is provided. Specifically, and in an embodiment, a VR session is established and VR room rendered during the VR session. Files describing and program instructions for interactively manipulating a SST are loaded into the VR room. At least one component of the SST during the VR session is manipulated as directed by a VR input device operated by a participant within the VR room.

DETAILED DESCRIPTION

Figure 1A:
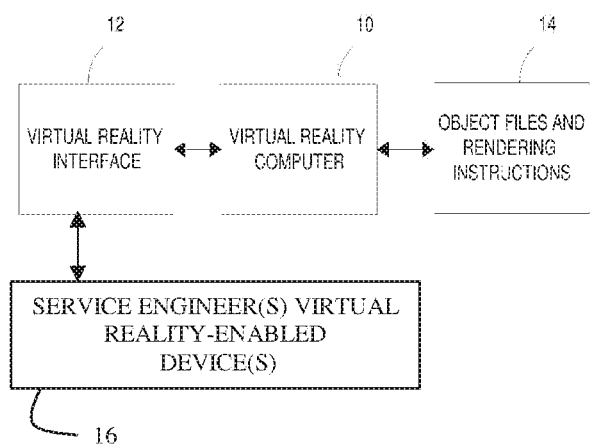
FIG. 1A is a diagram of a system for VR repair and maintenance, according to an example embodiment.

FIG. 1 is a diagram of a system for VR repair and maintenance, according to an example embodiment. The system is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the VR repair and maintenance techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for VR repair and maintenance can be implemented in all, or some combination of the components shown in different hardware computing devices having one or more hardware processors.

The system includes: a VR computer 10, a VA interface, object files and rendering instructions 14, and one or more service engineer VR-enabled devices 16.

The VR computer 10 executes VR software, which establishes a three-dimensional (3D) virtual room or world within which one or more VR sessions (stories) can be processed.

In one example, the VR computer 10 is part of a cloud-based system connected to a network, which may include a global communications network, also known as the Internet. VR computer 10 can include one or more processors, memory, and program and data storage.

The VR interface connects to VR computer 10 and may include a variety of VR-enabled devices 16 and input device that connects to the VR computer 10 for a VR session/story over the network.

Any VR session may also be configured with relevant object files and rendering instructions 14 available and interfaced to the VR computer 10. In an embodiment, the VR computer 10 receives as input to a VR session Computer-Assisted Design (CAD) files and program instructions 14 for creating a virtual representation of a real-world object.

In one example, the CAD files and program instructions 14 include renderings of a SST, such as an ATM or kiosk.

Figure 1B:
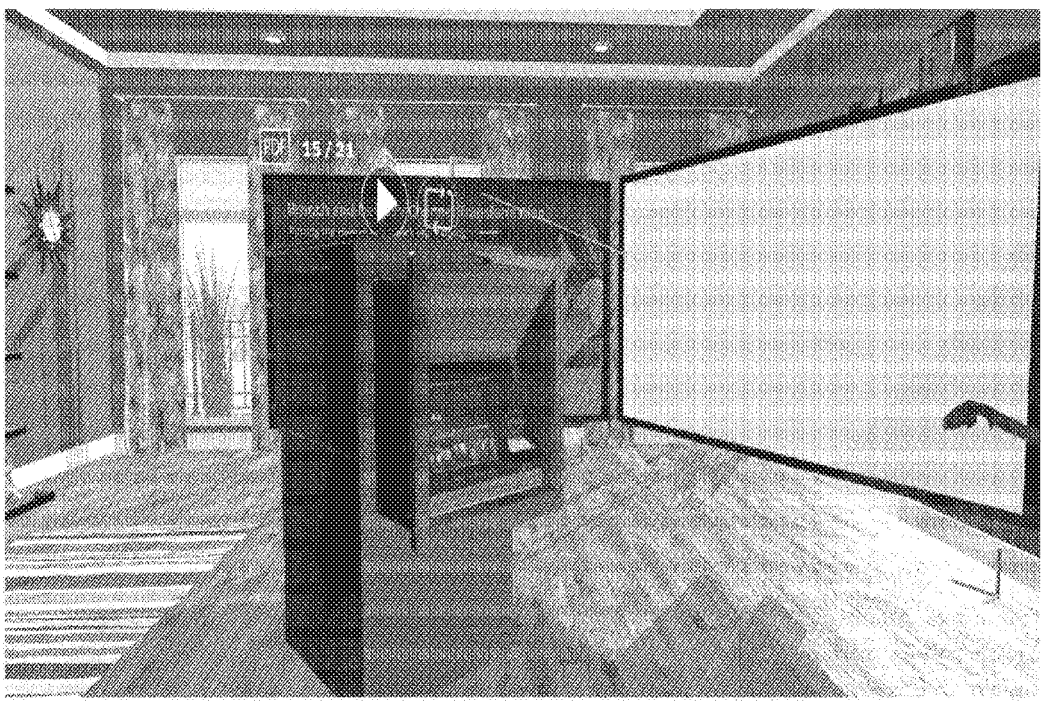
FIG. 1B is diagram of for a rendering of a VR object within a VR room representing a make and model of a real-world SST, according to an example embodiment.

The FIG. 1B depicts an example rendering of an ATM that can be presented during a VR session. VR computer 10 loads the CAD files and program instructions 14 and renders a specific make and mode of a real-world SST as a 3D virtual object in the VR session (virtual world story). Using the service engineer VR-enabled devices technicians can access the VR interface for viewing, interacting, and manipulating the 3D virtual object rendering of the SST. For example, technicians (may also be referred to as "engineers" herein) may disassemble the 3D virtual object, simulate operating the 3D virtual object, and position or move component pieces of the 3D virtual object within the VR session.

In an embodiment, the VR session is a collaborative session so that more than one person (technician or engineer) can interact with the rendered objects in augmented space and at the same time during the collaborative VR session.

In an embodiment, people can discuss and work on models of real-world objects rendered as 3D virtual objects within the VR room (created for the VR session) while such people are geographically dispersed from one another in real-world space.

In an embodiment, the VR room includes visible whiteboards that allow people to play, post, and/or interact with videos playing in the VR session and/or interact with documents presented in the VR session.

Some operational scenarios for any given VR session rendered by the VR software of the VR computer 10 include:

1. hardware development (to assist in developing a collaborative design between engineers and collaborate between engineers and suppliers);

2. new product introduction planning and deployment (for example, what a model looks like when assembled, hot to transfer knowledge from on factory to another);

3. sales tool demonstrations to show customers a completed model's options before the customers ever receive a unit of the model;

4. customer field engineer tool (allow the field engineer to bring in a remote expert and explain what they should be seeing and how they can fix a particular fault, as a training need out in the field to show field engineers different models and allow them to break the models down without actually having to ever touch the units of the models in the real world; and 5. sales tool for marketing to show many different models without having to take them to all locations, which may be span the entire globe.

In an embodiment, and during a collaborative VR session, a specific make and model of an ATM is rendered for collaboration between multiple engineers. During the session, one of the engineers may be physically present at a specific ATM that the engineer is experiencing difficulty in servicing. The VR headset 116 of that engineer may also be equipped with a front-facing camera, such that the engineer can cast information in real time that the specific ATM is displaying on its display or the sequence of display information that occurs in real time when the engineer performs a sequence of operations at the specific ATM. This real world information is casted to a white board present in the VR room rendered for the session. A remote engineer also participates in the session from a geographically dispersed location from where the specific ATM and the first engineer are located. The remote engineer can see how the ATM is responding within the VR room and has access to the 3D rendered CAD object representing the same make and model as the specific ATM. The remote engineer can then manipulate the various rendered objects (white board with real-time information being displayed from the specific ATM) and the 3D rendered CAD object for visually and audibly instructing the engineer present at the specific ATM on how to fix the issue with the specific ATM. For example, the remote engineer may demonstrate within the VR session what key sequences on the ATM that the engineer present at the ATM should try and/or the remote engineer may demonstrate how to remove a component piece of the ATM and replace it with a replacement component piece of equipment.

In another example, and during a VR session, a collaborative participant can cast a screen shot appearing on a separate computing device of that participant onto the whiteboard during the session. For example, a particular document or web page that one of the collaborators wants to share can be projected onto the whiteboard for all of the collaborators to view during the session.

In an embodiment, the VR interface 12 includes an option to share a screen of computing device on the whiteboard during a VR session. In an embodiment, control of the screen may be delegated to the VR session, such that a collaborator can take remote control of the interface associated with the screen of the computing device being shared on the whiteboard during the VR session.

In an embodiment, the VR interface 12 is interfaced to a plurality of APIs that permit a direct connection and interaction with interfaces of an SST being physically serviced by one of the participants to a VR session. This allows a remote participant to connect to interfaces of the SST and remotely perform operations on that SST during the VR session on behalf of the participant that is physically present at the SST that is being serviced. The operations performed can be displayed on the whiteboard during the VR session.

In an embodiment, as each participant in a collaborative VR session manipulates an object rendered in the VR room of the VR session, such participant is unique identified to all the participants in the VR session. Such participant identification can also be made when a participant is speaking during the VR session.

In an embodiment, and during a VA session, any of the participants can send an out-of-band (external to the VR session) invitation to a non-participant of the VR session to dynamically join in and participate in the collaborative VR session. This can be done through the VR interface 12 permitting options to the participants to send emails, texts, or other types of messages through an out-band message for the non-participant to join. The VR interface 12 can include a link that when activated from the message permits the non-participant to join in and participate as a participant in the VR session with the other participants.

In an embodiment, the VR interface 12 permits any VR session to be recorded and subsequently accessed for playback by a non-participant or by one of the participants. In an embodiment, the audio of the VA session is only recorded with no video.

In an embodiment, the VR interface 12 permits any VR session to be categorized according to any user-defined or enterprise criteria, such as based on the type of problem or type of equipment being discussed during the VR session. In an embodiment, the VR interface 12 automatically stores a recording of a VR session in a database or directory structure based on a category assigned to the VR session. In an embodiment, the VR interface 12 automatically stores a recording of a VR session in a database or directory structure based on identifiers of the participants and/or identifiers associated with the real-world equipment rendered during the VR session. Such embodiments permit organizations to leverage knowledge and information obtained from collaborative VR sessions throughout the organizations.

In an embodiment, a post-indexing program can convert speech recognized during any VR session from recordings into text and index the text for subsequent search and retrieval. In an embodiment, any written information displayed on the whiteboard or through a shared screen shot have Optical Character Recognition processed against it to produce text for some of the visual information presented during the VR session and such text can similarly be indexed for subsequent search and retrieval. In an embodiment, the indexed text includes a link to its location within the VR session for directly accessing a specific portion of the VR session during a search and retrieval operation.

One now appreciates how maintenance and repair of real-world equipment can be addressed within VR sessions for collaboration, collection of knowledge, and leveraging the knowledge. This is done without regard to the physical real-world locations of the VR session participants and the physical location of the equipment being serviced.

These and other embodiments are now discussed with reference to the FIGS. 2-4.

Figure 2:
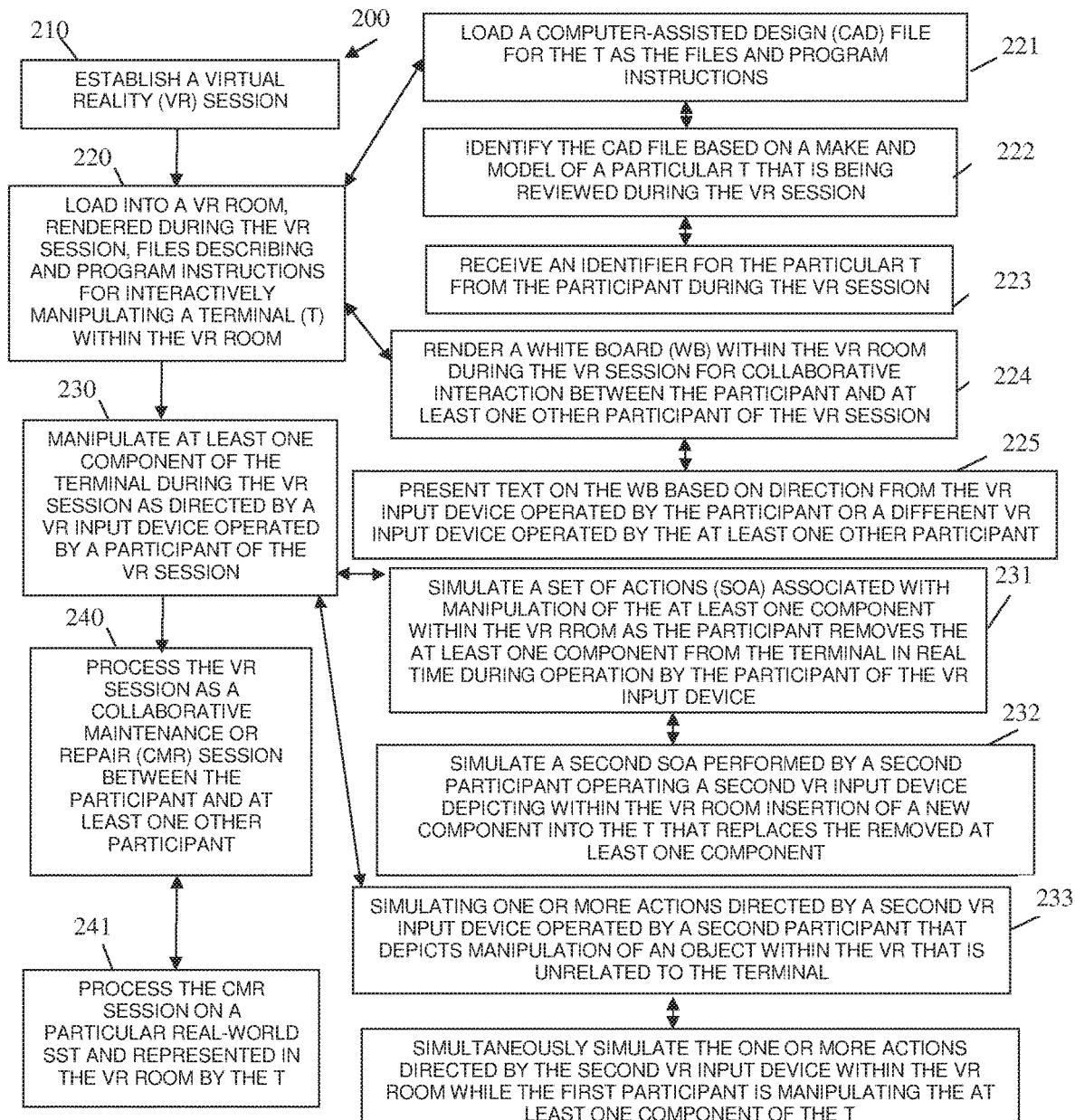
FIG. 2 is a diagram of a method for VR repair and maintenance, according to an example embodiment.

FIG. 2 is a diagram of a method 200 for VR repair and maintenance, according to an example embodiment. The software module(s) that implements the method 200 is referred to as a "VR session manager." The VR session manager is implemented as executable instructions programmed and residing within memory and/or a non-transitory computer-readable (processor-readable) storage medium and executed by one or more hardware processors of a hardware computing device. The processors of the device that executes the VR session manager are specifically configured and programmed to process the VR session manager. The VR session manager has access to one or more networks during its processing. The networks can be wired, wireless, or a combination of wired and wireless.

In an embodiment, the device that executes the VR session manager is a single device or set of devices that process in a cloud processing environment.

In an embodiment, the device that executes the VA session manager is a server.

In an embodiment, the VR session manager all or some combination of the VR interface 12 and the VA software executing on the VR computer 10.

In an embodiment, VR session manager renders VA sessions for collaborative performing maintenance or repair on a real-word SST. In an embodiment, the SST is an ATM. In an embodiment, the SST is a kiosk.

In an embodiment, VR session manager renders VR sessions for collaborative performing maintenance or repair on a real-word Point-Of-Sale (POS) terminal. In an embodiment, the POS terminal is operated by a clerk during normal operation to assist customers in performing checkout operations at a retailer.

At 210, the VR session manager establishes a VR session. This can be done through a VR-enabled device, such as 16, and through the VR interface 12.

At 220, the VR session manager loads into a VR, during the VA session, files describing and program instructions for interactively manipulating a terminal within the VR room.

According to an embodiment, at 221, the VR session manager loads a CAD file for the terminal as the files and program instructions.

In an embodiment of 221 and at 222, the VR session manager identifies the CAD files based on a make and model of a particular terminal that is being reviewed during the VR session.

In an embodiment of 222 and at 223, the VR session manager receives an identifier for the particular terminal from a participant of the VR session and during the VR session.

In an embodiment, at 224, the VR session manager renders a white board within the VR room during the VR session for collaborative interaction between the participant and at least one other participant of the VR session.

In an embodiment of 224 and at 225, the VR session manager presents text on the white board based on direction from a VR input device operated by the participant or based on direction from a different UR input device operated by the at least one other participant.

At 230, the VR session manager manipulates at least one component of the terminal during the VR session as directed by a VR input device operated by a participant of the VR session.

According to an embodiment, at 231, the VR session manager simulates a set of actions associated with manipulation of the at least one component within the VR room as the participant removes the at least one component from the terminal in real time during operation by the participant of the VR input device.

In an embodiment of 231 and at 232, the VR session manager simulates a second set of actions performed by a second participant operating a second VR input device that depicts, within the VR room, insertion of a new component into the terminal that replaces the removed at least one component.

In an embodiment, at 233, the VR session manager simulates one or more actions directed by a second VR input device operated by a second participant that depicts manipulation of an object within the VR room that is unrelated to the terminal.

In an embodiment of 233 and at 234, the VR session manager simultaneously simulates the one or more actions directed by the second VR input device, within the VR room, while the first participant is manipulating the at least one component of the terminal with the VR input device.

According to an embodiment, at 240, the VR session manager processes the VR session as a collaborative maintenance or repair session between the participant and at least one other participant of a real-world terminal.

In an embodiment of 240 and at 241, the VR session manager processes the collaborative maintenance or repair session on a particular real-world SST represented by the terminal.

Figure 3:
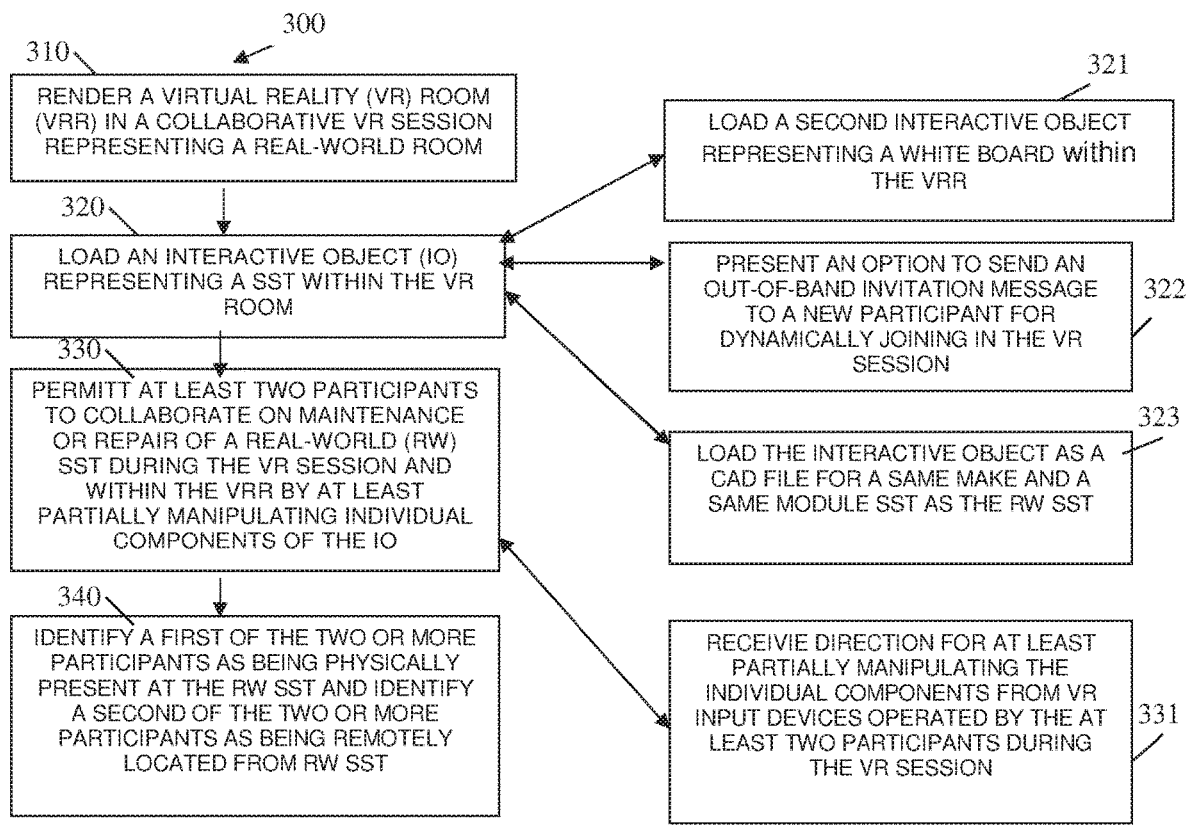
FIG. 3 is a diagram of another method for VR repair and maintenance, according to an example embodiment.

FIG. 3 is a diagram of another method 300 for VR repair and maintenance, according to an example embodiment. The software module(s) that implements the method 300 is referred to as a "VR room manager." The VR room manager is implemented as executable instructions programmed and residing within memory and/or a non-transitory computer-readable (processor-readable) storage medium and executed by one or more hardware processors of a hardware device. The processors of the device that executes the VR room manager are specifically configured and programmed to process VR room manager. The VR room manager has access to one or more networks during its processing. The networks can be wired, wireless, or a combination of wired and wireless.

In an embodiment, the device that executes the VR room manager is a single device or set of devices that process in a cloud processing environment.

In an embodiment, the device that executes the VR room manager is a server.

In an embodiment, the VR room manager all or some combination of the VR interface 12, the VR software executing on the VR computer 10, and/or the method 200.

In an embodiment, the VR room manager generates instances of VR rooms during VR sessions and manages the rooms and sessions during collaboration of participants that are collaborating on maintenance or repair on a real-world SST. In an embodiment, the SST is an ATM. In an embodiment, the SST is a kiosk.

In an embodiment, the VR room manager generates instances of VR rooms during VR sessions and manages the rooms and session during collaboration of participants that are collaborating on maintenance or repair on a real-world POS terminal. In an embodiment, the POS terminal is operated by a clerk when assisting a customer in checking out during a transaction with a retailer.

At 310, the VR room manager renders a VR room in a collaborative VR session representing a real-world room.

At 320, the VR room manager loads an interactive object representing a SST within the VR room.

In an embodiment, at 321, the VR room manager loads a second interactive object representing a white board within the VR room.

In an embodiment, at 322, the VR room manager presents an option to send an out-of-band message to a new participant for dynamically joining the VR session.

In an embodiment, at 323, the VR room manager loads the interactive object as a CAD file for a same make and a same module SST as a real-world SST.

At 330, the VR room manager permits at least two participants to collaborative on maintenance or repair of a real-world SST during the VR session and within the VR room by at least manipulating components of the interactive object.

In an embodiment, at 331, the VR room manager receives direction for at least partially manipulating the individual components from VR input devices operated by the at least two participants during the VR session.

According to an embodiment, at 340, the VR room manager identifies a first of the two or more participants as being physically present at the real-world SST and identifies a second of the two or more participants as being remotely located from the real-world SST.

Figure 4:
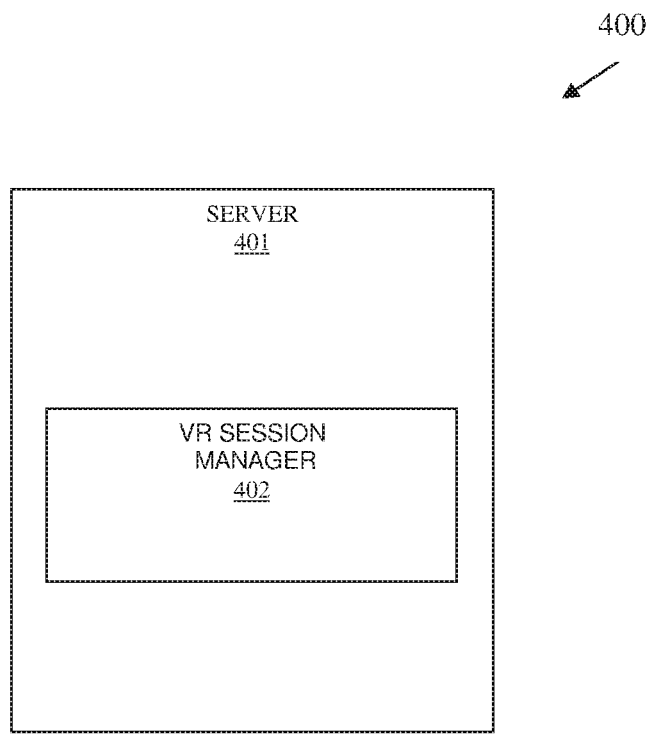
FIG. 4 is a diagram of another system for VR repair and maintenance, according to an example embodiment.

FIG. 4 is a diagram of another system 400 for VR repair and maintenance, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the processing described above with the FIG. 1A-1B.

In an embodiment, the system 400 implements, inter alia, the method 200 of the FIG. 2.

In an embodiment, the system 400 implements, inter alia, the method 300 of the FIG. 3.

The system 400 includes a server 401 and the server including VR session manager 402.

The VR session manager 402 is configured to: 1) execute on at least one hardware processor of the server 401; 2) establish a VR session between two or more participants, 3) render an interactive model of a real-world terminal within a VR room of the VR session, and 4) permit interactive manipulation of components of the interactive model by the two or more participants within the UR room.

In an embodiment, the terminal is a SST.
In an embodiment, the terminal is an ATM.
In an embodiment, the terminal is a kiosk.
In an embodiment, the terminal is a POS terminal.

In an embodiment, the VR session manager 402 is the VR interface 12, the VR software executing on the VR computer 10, the method 200, the method 300, and/or some combination of these.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   establishing, by a set of executable instructions representing a Virtual Reality (VR) interface that is executed on a hardware processor from a non-transitory computer-readable storage medium, a VR session;
   loading, by the VR interface, into a VR room and rendered during the VR session, files describing and program instructions that are processed, permitting:
   viewing, interacting, and manipulating a Point-Of-Sale (POS) terminal within the VR room,
   wherein the POS terminal is represented as a real-world POS terminal with a plurality of real-world component pieces represented as components,
   wherein loading further includes rendering a white board within the VR room during the VR session for collaborative interaction between participants of the VR session,
   wherein rendering further includes presenting text on the white board based on direction from a first VR input device operated by one of the participants or a different VR input device operated by a different one of the participants,
   wherein presenting further includes playing and posting one or more videos and documents on the white board for the participants to interact within the VR room and during the VR session;
   manipulating, by the VR interface, at least one component of the POS terminal during the VR session as directed by VR input devices operated by the participants collaborating during the VR session through manipulation and interaction with a component object in the VR room,
   the component object representing the at least one component, wherein manipulating further includes
   operating the component object within the VR room,
   positioning the component object with the VR room,
   removing the component object from the POS terminal based on interaction of the participants during the VR session using the VR input devices, and
   replacing the component object with a replacement component object within the POS terminal based on other interactions of the participants,
   wherein manipulating further includes manipulating the component object by at least two of the participants during the VR session; and
   processing, by the VR interface, the VR session as a collaborative maintenance or repair session between the participants,
   wherein a particular one of the participants is physically present at the real-world POS terminal and wears a VR headset, the VR headset comprising a front facing camera that casts real-time information specific to what is being displayed on a POS display of the real-world POS terminal on the white board during the VR session.

2. The method of claim 1, wherein loading further includes loading a Computer-Assisted Design (CAD) file for the POS terminal as the files and program instructions.

3. The method of claim 2, wherein loading further includes identifying the CAD file based on a make and model of a particular POS terminal that is being reviewed during the VR session.

4. The method of claim 3, wherein identifying further includes receiving an identifier for the particular POS terminal from at least one of the participants during the VR session.

5. The method of claim 1, wherein manipulating further includes simulating a set of actions associated with manipulation of the at least one component within the VR room as one of the participants removes the at least one component from the POS terminal in real time during operation by that participant of the first VR input device.

6. The method of claim 5, wherein simulating further includes simulating a second set of actions performed by a different participant operating the different VR input device that depicts, within the VR room, insertion of a new component into the POS terminal that replaces the removed at least one component.

7. The method of claim 1, wherein manipulating further includes simulating one or more actions directed by the different VR input device operated by a second participant that depicts manipulation of an object within the VR room that is unrelated to the POS terminal, wherein a first participant operates the first VR input device and the second participant operates the different VR input device.

8. The method of claim 7, wherein simulating further includes simultaneously simulating the one or more actions directed by the different VR input device within the VR room while the first participant is manipulating the at least one component of the POS terminal.

9. The method of claim 1, wherein processing further includes processing the collaborative maintenance and repair session on a particular real-world Self-Service Terminal (SST) and represented in the VR room by the POS terminal.

10. A method, comprising:
rendering, by a set of executable instructions representing a Virtual Reality (VR) interface that is executed on a hardware processor from a non-transitory computer-readable storage medium, a VR room in a collaborative VR session representing a real-world room on a display;
loading, by the VR interface, an interactive object representing a Self-Service Terminal (SST) within the VR room,
wherein loading further includes loading the interactive object as a plurality of real-world component pieces of a real-world SST as components of the interactive object,
wherein loading further includes loading a second interactive object representing a white board within the VR room,
wherein loading further includes presenting text on the white board based on direction from a first VR input device operated by one of at least two participants or a different VR input device operated by a different one of the at least two participants,
wherein presenting further includes playing and posting one or more videos and documents on the white board for the at least two participants to interact within the VR room and during the VR session;
permitting, by the VR interface, the at least two participants to collaborate on maintenance or repair of a real-world SST during the VR session and within the VR room by at least partially manipulating individual components of the interactive object; and
collaborating by the at least two participants through the VR interface on the real-world SST by manipulating the interactive object within the VR room,
wherein collaborating further includes operating a specific component within the VR room,
positioning the specific component within the VR room,
removing the specific component from the interactive object based on interaction of the at least two participants during the VR session with the interactive object, and
replacing the specific component with a replacement component within the interactive object based on other interactions of the at least two participants,
wherein collaborating further includes manipulating the interactive object by both the at least two of the participants during the collaborative VR session,
wherein a particular one of the participants is physically present at the real-world SST and wears a VR headset, the VR headset comprising a front facing camera that casts real-time information specific to what is being displayed on an SST display of the real-world SST on the white board during the VR session.

11. The method of claim 10, wherein loading further includes presenting an option to send an out-of-band invitation message to a new participant for dynamically joining in the VR session.

12. The method of claim 10, wherein loading further includes loading the interactive object as a Computer-Assisted design file for a same make and a same module SST as the real-world SST.

13. The method of claim 10, wherein permitting further includes receiving direction for at least partially manipulating the individual components from the first VR input device and the different VR input device manipulated by the at least two participants during the VR session.

14. The method of claim 10 further comprising identifying, by the VR interface, a first of the two or more participants as being physically present at the real-world SST and identifying a second of the two or more participants as being remotely located from the real-world SST.

15. A system, comprising:
a server including a hardware processor and a non-transitory computer-readable storage medium;
the non-transitory computer-readable storage medium including executable instructions representing a Virtual Reality (VR) session manager; and
the VR session manager is executed as the executable instructions by the hardware processor and configured to perform processing on the server to:
establish a VR session between two or more participants;
render an interactive model of a real-world terminal within a VR room of the VR session as objects, wherein each object represents a real-world component piece of the real-world terminal;
load a particular interactive object representing a white board within the VR room;
present text on the white board based on direction from a first VR input device operated by one of the two participants or a different VR input device operated by a different one of the two participants;
play and post one or more videos and documents on the white board for the two participants to interact within the VR room and during the VR session; and
permit interactive manipulation of the objects by the two or more participants within the VR room to collaborate on the interactive model for the real-world terminal, and operate a specific component of the real-word terminal within the VR room,
position the specific component within the VR room,
remove the specific component from the interactive model based on interaction of the participants during the VR session with the objects, and
replace the specific component with a replacement component within the interactive model based on other interactions of the participants,
wherein both of the two or more participants interact with the objects during the VR sessions;
wherein a particular one of the participants is physically present at the real-world terminal and wears a VR headset, the VR headset comprising a front facing camera that casts real-time information specific to what is being displayed on a terminal display of the real-world terminal on the white board during the VR session.

16. The system of claim 15, wherein the real-world terminal is one of: an Automated Teller Machines (ATMs), a kiosk, and a Point-Of-Sale (POS) terminal.

\* \* \* \* \*